United States Patent

Annapareddy et al.

[11] Patent Number: 6,101,194
[45] Date of Patent: Aug. 8, 2000

[54] CONFLICT RESOLUTION IN MULTI-NODE COMMUNICATION NETWORK

[75] Inventors: Narasimha Lakshmi Annapareddy, College Station, Tex.; James Thomas Brady; Damon W. Finney, both of San Jose, Calif.; Michael Howard Hartung, Tucson, Ariz.; Michael Anthony Ko; Jai M. Menon, both of San Jose, Calif.; David Ronald Nowlen, Morgan Hill, Calif.

[73] Assignee: International Business Machines Corporation, Armonk, N.Y.

[21] Appl. No.: 08/871,165

[22] Filed: Jun. 9, 1997

[51] Int. Cl.[7] .................................................. H04J 3/02
[52] U.S. Cl. .......................... 370/447; 370/420; 370/450; 370/462
[58] Field of Search ................................... 370/216, 217, 370/221, 225, 341, 346, 396, 432, 433, 447, 450, 462, 390, 395, 401, 402, 420, 445, 414

[56] References Cited

U.S. PATENT DOCUMENTS

| | | | |
|---|---|---|---|
| 4,661,902 | 4/1987 | Hochsprung et al. | 364/200 |
| 4,766,534 | 8/1988 | DeBenedictis | 364/200 |
| 4,845,744 | 7/1989 | DeBenedictis | 379/221 |
| 5,170,393 | 12/1992 | Peterson et al. | 370/94.1 |
| 5,175,733 | 12/1992 | Nugent | 370/94.3 |
| 5,301,185 | 4/1994 | Cherry | 370/216 |
| 5,319,641 | 6/1994 | Fridrich et al. | 370/85.3 |
| 5,347,450 | 9/1994 | Nugent | 395/200 |
| 5,398,317 | 3/1995 | Nugent | 395/200 |
| 5,404,565 | 4/1995 | Gould et al. | 395/800 |
| 5,436,903 | 7/1995 | Yang et al. | 370/85.3 |
| 5,513,322 | 4/1996 | Hou | 395/200.15 |
| 5,673,031 | 9/1997 | Meier | 370/346 |
| 5,737,330 | 4/1998 | Fulthorp et al. | 370/346 |
| 5,953,318 | 9/1999 | Nattkemper et al. | 370/396 |

*Primary Examiner*—Douglas W. Olms
*Assistant Examiner*—Shick Hom
*Attorney, Agent, or Firm*—Gray Cary Ware Freidenrich

[57] ABSTRACT

Conflicts are resolved between competing nodes in a multi-node communications network. After a first node in the network requests an initiation of communications with a target node, the requesting node may simply initiate the requested communications with the target node if the target node is not busy. If the first node determines that the target node is busy, it proceeds to resolve the conflict. Namely, the first node repeats the process of waiting for a first delay then requesting initiation of communications with the target node. After each unsuccessful attempt, the first delay is successively increased. As an example, the delay may be increased exponentially, with a controlled randomness added. After a or more queued messages to other nodes. Following this, the first node performs another sequence to initiate communications with the target node, successively increasing the delay between unsuccessful attempts, as before. After a predetermined number of unsuccessful passes through the foregoing routine, the first node proceeds to take appropriate action, such as initiating an error recovery routine, sending the message via different hardware components, or issuing an error message.

81 Claims, 4 Drawing Sheets

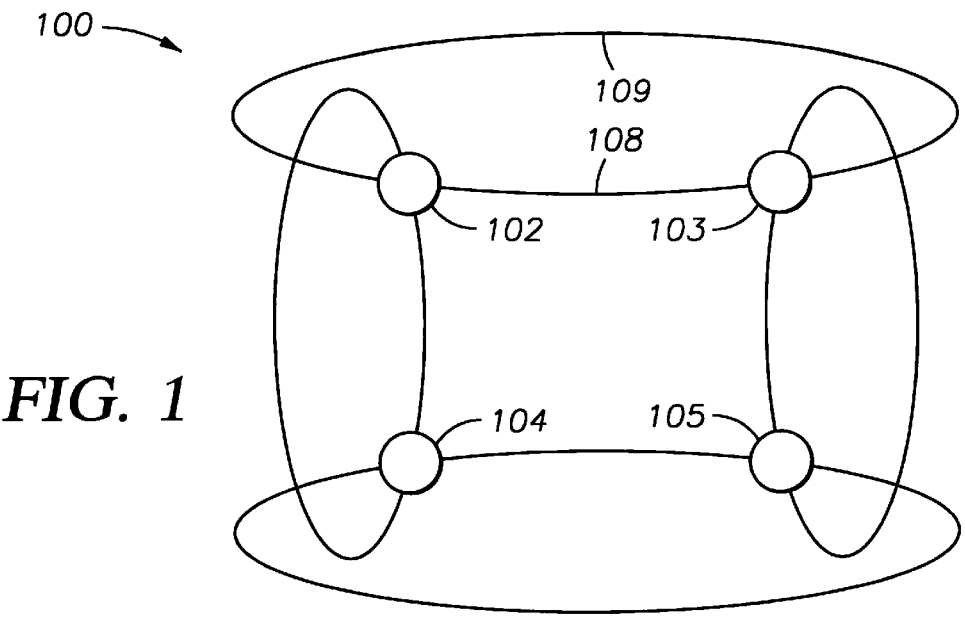
FIG. 1
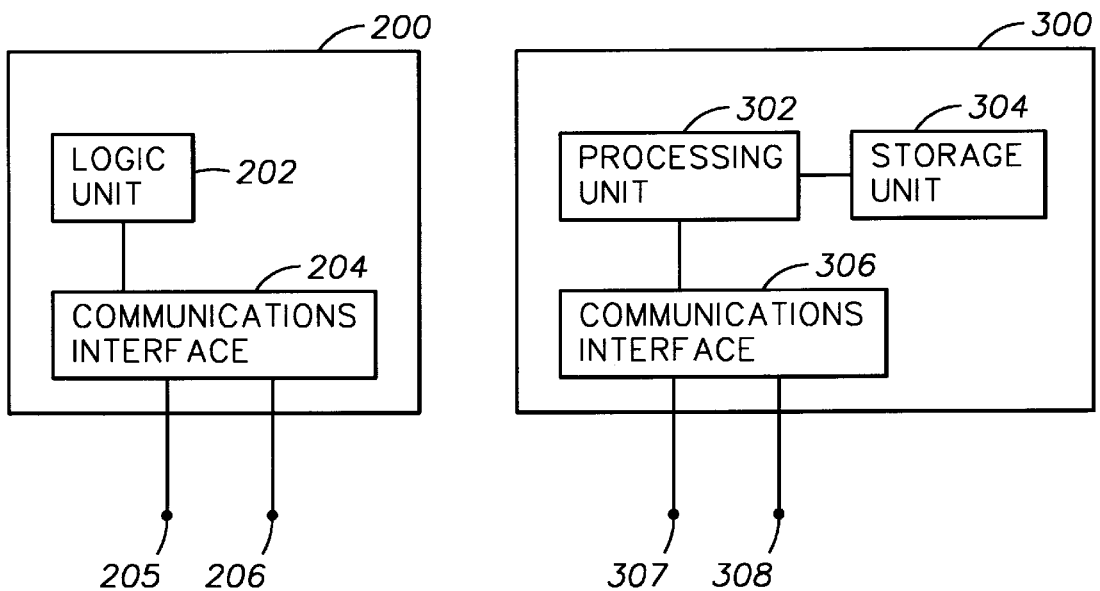
FIG. 2   FIG. 3

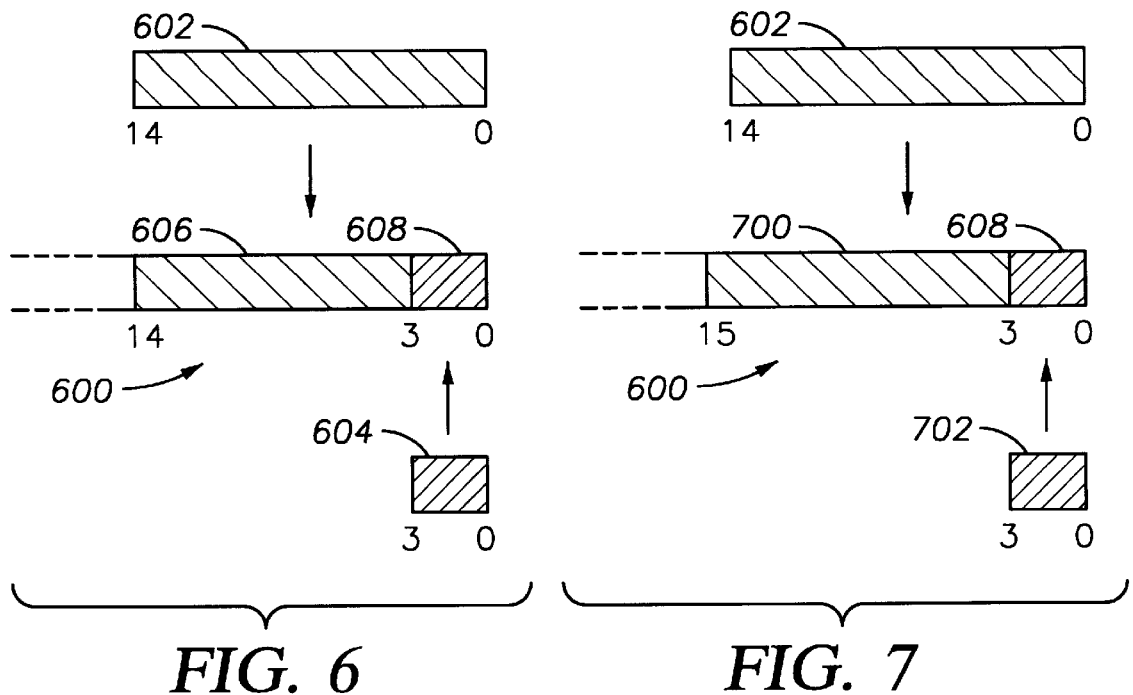
*FIG. 6*
*FIG. 7*
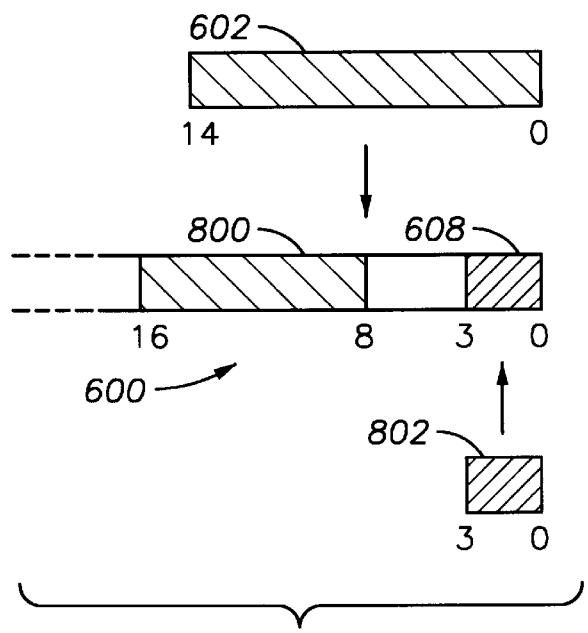
*FIG. 8*

CONFLICT RESOLUTION IN MULTI-NODE COMMUNICATION NETWORK

BACKGROUND OF THE INVENTION

1. Field of the Invention

The present invention relates to multi-node communication networks. More particularly, the invention concerns a process, apparatus, and article of manufacture useful for resolving conflicts between different nodes for access to the same requested node.

2. Description of the Related Art

In today's market, engineers are developing more and more powerful automated electronic machines and subcomponents, such as personal computers, printers, display monitors, printed circuit boards, and the like. As the power of these devices increases, so must their ability to communicate with each other. A device's computation power is diminished if it cannot communicate quickly and efficiently with other devices.

Inter-device conflicts are one type of problem that frustrates efficient communications. This occurs when a requesting device cannot communicate with a target device because the target device is already communicating with another device. Communication conflicts most often arise in multi-node networks, since these networks include many different intercommunicating nodes, which frequently make overlapping communication requests.

In one common scenario, the conflict occurs because the communication path to the target device is busy, irrespective of whether the target device itself is busy. This situation often arises where multiple devices share a common bus. If the bus is busy, a requesting device cannot access the target device, irrespective of whether the target device itself is busy.

Engineers have developed a number of different techniques for resolving conflicts in various single-communications-path systems. One such technique is called "exponential backoff". With exponential backoff, a node that experiences a communications conflict waits for a predetermined time, and then re-attempts the communications. For each unsuccessful attempt, the node multiplicatively increases the wait, e.g., doubling the previous wait. Thus, with repeated unsuccessful attempts, the node's wait increases exponentially. During the wait times, the node sits idle or performs self-contained processing.

Although exponential backoff may satisfy many applications, it may not be entirely adequate for certain other uses. One potential drawback may manifest itself when two requesting nodes are seeking access to the same target node. If the nodes both commence the same exponential backoff routine simultaneously, the nodes' waiting periods and retry attempts will occur at the same times. Thus, both nodes will be frustrated in their attempts to communicate with the target node. Furthermore, the efficiency of these nodes is sharply reduced, since both nodes spend a significant time unsuccessfully attempting to resolve a simple conflict.

Another conflict resolution technique for single-communication-path systems is called "random backoff". With random backoff, a node that experiences a communications conflict waits for a randomly determined time, and then reattempts the communications. For each unsuccessful attempt, the node waits for a different randomly computed period of time before retrying. During the wait times, the node sits idle or performs self-contained processing.

Random backoff provides a useful conflict resolution tool that has many different applications. However, in certain high traffic networks, a requesting node may waste a substantial amount of time attempting to communicate with a target mode that is busy for along period of time. The delay is further compounded by the inefficiencies of "context switching", as the requesting node repeatedly switches between some background application and its attempts to communicate with the target node. In other cases, the requesting node may be frustrated if, while the requesting node backs off and waits, the target node may free up but quickly re-engage in commnmications with another node. Furthermore, occasions can arise when two nodes generate a sufficiently similar random number that they wait for the same period, and then concurrently reattempt communications, thus conflicting with each other again.

With both exponential backoff and random backoff approaches, the frustrated requesting nodes' efficiency is reduced while they wait for a communications path with the target node to open up. Not only are the requesting nodes prevented from communicating with the target node, but the occupied common communications path prevents them from communicating with any other nodes for which communication jobs may be pending. This wastes channel bandwidth by repeatedly attempting to send the message, and also incurs significant context switching overhead.

SUMMARY OF THE INVENTION

Broadly, the present invention concerns the resolution of conflicts in a multi-node communications network. A first node in the network first requests an initiation of communications with a target node. If the target node is not busy, the requesting node initiates the requested communications with the target node. If the target node is busy, the first node determines that the target node is busy and performs a certain steps to resolve the conflict. Namely, the first node repeatedly (1) waits for a first delay then (2) requests initiation of communications with the target node. After each unsuccessful attempt, the first delay is successively increased.

After a predetermined number of attempts, the first node diverts to another task by sending one or more queued messages to other nodes. Following this, the first node performs another sequence to initiate communications with the target node, successively increasing the delay between unsuccessful attempts, as before. After a predetermined number of unsuccessful passes through the foregoing routine, the first node takes appropriate action, such as performing an error recovery routine, attempting to complete the communications in a different way, or abandoning the communications.

Accordingly, in one embodiment the invention may be implemented to provide a method to resolve conflicts in a multi-node communications network. In another embodiment, the invention may be implemented to provide an apparatus such as the previously mentioned network, or a node therein, configured to resolve conflicts as discussed above. In still another embodiment, the invention may be implemented to provide a programmed product comprising signal-bearing media tangibly embodying a program of machine-readable instructions executable by a digital data processing apparatus to perform a method for resolving conflicts in a multi-node communications network.

The invention affords its users with a number of distinct advantages. Chiefly, the invention encourages more efficient operation of multi-node communications systems by resolving conflicts among the nodes. By resolving conflicts more effectively, the invention enables the nodes to spend more time processing data and communicating with each other, and less time solving accessibility problems. The communication nodes of the invention are especially efficient because, during waiting periods between successive communications attempts, these nodes perform queued communications with other nodes than the target node. This is a result of the present inventors' recognition of the foregoing solutions' inherent inefficiency for use in networks that use multiple communications paths between each pair of devices. Namely, the inventors have recognized that, while communications of a requesting device and a target device may be frustrated, the requesting device can operate more efficiently by communicating with other, presently available devices in a multi-path environment.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 1 is a diagram of a communications network according to the invention.

FIG. 2 is a diagram of an exemplary communications node according to the invention.

FIG. 3 is a diagram of a different exemplary communications node according to the invention.

FIGS. 6–8 are diagrams depicting the setting of a wait timer register according to the invention.

DETAILED DESCRIPTION OF THE PREFERRED EMBODIMENTS

HARDWARE COMPONENTS & INTERCONNECTIONS

Network

Figure 4:
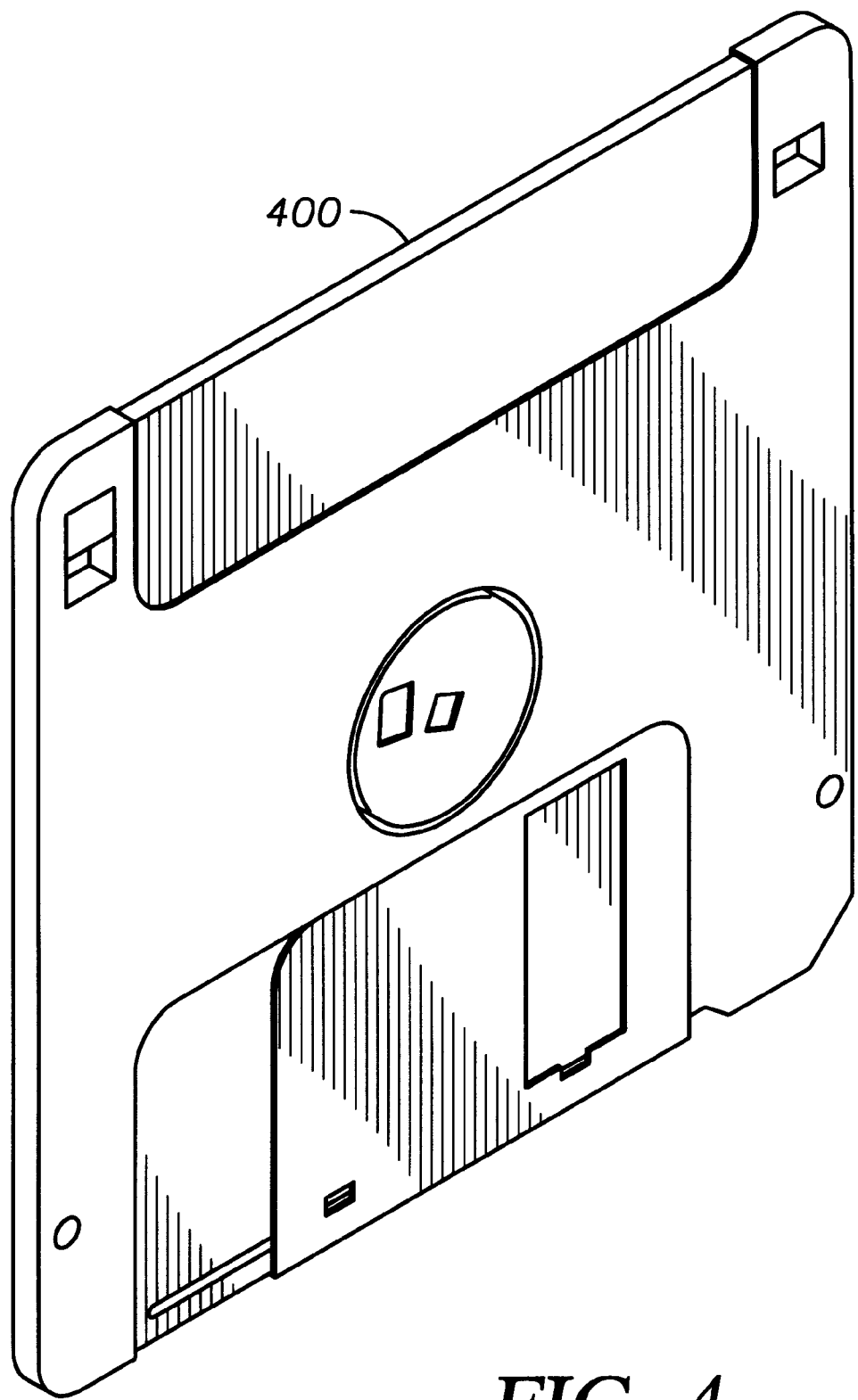
FIG. 4 is an article of manufacture comprising a programmed data storage medium, pursuant to the invention.

One aspect of the invention concerns a communications network, including multiple communications nodes capable of communicating with each other. As an illustrative example, this network may be embodied by various hardware components and interconnections as described in FIG. 1. The network 100 includes multiple nodes 102–105, numbering four in the present example. The nodes may be interconnected to facilitate communications between any two nodes. In the present example, the nodes 102–105 are coupled in a torus network, where adjacent nodes are coupled by two communications links. Thus, each node has multiple paths to every other node, either directly or via another node. For example, the nodes 102–103 are interconnected by the links 108–109.

Each of the nodes 102–105 is preferably assigned a node-ID, which is a numeric, alphabetic, alphanumeric, or other code unique to that node. All node-IDs preferably contain the same number of characters. Preferably, the node-10 is a binary number.

The links, such as links 108–109, may be implemented in a number of different forms. As examples, the links may comprise conductive metallic cables, metallic wires, electromagnetic broadcast links, optically transmissive media such as fiber optic cable, traces on a printed circuit board, or any other suitable media for conveying data between electronic devices. Ordinarily skilled artisans having the benefit of this disclosure will also recognize other links within the scope of this disclosure.

Furthermore, many different connection schemes may be used in substitution for the node connection shown in FIG. 1. Although not essential, it is preferred that each two nodes are interconnected by at least two communication paths.

Node

Each of the nodes 102–105 comprises an electronic machine capable of communicating over the provided link. Accordingly, the nodes 102–105 may comprise a number of different hardware devices. For instance, the nodes 102–105 may include printers, display monitors, computer terminals, personal computers, mainframe computers, network servers, printed circuit boards, logic circuits, or any other electronic device capable of communicating with other devices. As one specific example, the nodes 102–105 may comprise printed circuit boards inside a personal computer, where the cards are interconnected by links comprising ribbon cable and/or traces on a motherboard. Moreover, ordinarily skilled artisans having the benefit of this disclosure may also recognize other suitable embodiments of node within the scope of this disclosure.

Each node includes a communications director coupled to a communications interface. The interface is coupled to one or more communications links in the network. The communications director oversees operations of the node, while the interface manages communications between the director and the link(s) attached to the interface. The communications director and interface may be implemented in a variety of forms as recognized by ordinarily skilled artisans having the benefit of this disclosure.

FIG. 2 depicts the components of an exemplary node 200. The communications director of the node 200 comprises a logic unit 202, which is coupled to a communications interface 204. The logic unit 202 comprises circuitry that performs an operational sequence for resolving conflicts, as discussed in greater detail below. The logic unit 202 may comprise discrete circuitry, a field programmable gate array, or another suitable circuit.

The interface 204 relays signals between the logic unit 202 and the communication lines 205–206. Each of the lines 205–206, for example, may be coupled to a communications link such as the links 108–109. The interface 204 therefore comprises an appropriate circuit for translating the voltages and signal formats between the lines 205–206 and the logic unit 202. The interface 204 may comprise, for example, a communications adapter card.

FIG. 3 depicts the components of a different exemplary node 300. In the node 300, the communications director comprises a processing unit 302. The processing unit 302 is coupled to a storage unit 304 and a communications interface 306. The processing unit 302 performs a sequence for resolving conflicts, as discussed in greater detail below. More particularly, the processing unit 302 comprises a digital processing apparatus that executes a series of machine-readable programming instructions. The processing unit 302 may comprise a microprocessor, mainframe computer, personal computer, workstation, or another suitable digital processing apparatus. As an example, the processing unit 302 may comprise a MOTOROLA 8051 microprocessor or an IBM POWERPC processor.

The storage unit 304 comprises a module for storing data, such as the machinereadable programming instructions executed by the processing unit 302. The storage unit 304 may be part of the processing unit 302, if desired. Preferably, the storage unit 304 comprises fast-access memory such as random access memory.

The interface 306 relays signals between the processing unit 302 and the communication lines 307–308. Each of the lines 307–308, for example, may be coupled to a communications link such as the links 108–109. The interface 306 therefore comprises appropriate circuitry for translating the voltages and message formats between the lines 307–308 and the processing unit 302. The interface 306 may comprise, for example, a communications adapter card.

OPERATION

In addition to the various hardware embodiments described above, a different aspect of the invention concerns a method for resolving communication conflicts in a multi-node communications network.

Signal-Bearing Media

With nodes implemented as shown in FIG. 3, such a method may be implemented by operating the processing unit 302 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform method steps to resolve conflicts experienced by the node 300.

This signal-bearing media may comprise, for example, fast access memory such as random access memory contained in the storage unit 304. Alternatively, the instructions may be contained in another signal-bearing media, such as a magnetic data storage diskette 400 (FIG. 4). Whether contained in the storage unit 304, diskette 400, or elsewhere, the instructions may instead be stored on another type of data storage medium such as DASD storage (e.g., a conventional "hard drive" or a RAID array), magnetic tape, electronic readonly memory (e.g., CD-ROM or WORM), optical storage device (e.g. WORM), paper "punch" cards, or other signal-bearing media including transmission media such as digital and analog and communication links and wireless. In an illustrative embodiment of the invention, the machine-readable instructions may comprise lines of compiled assembly or "C" language code, for example.

Overall Sequence of Operation

Introduction

Figure 5:
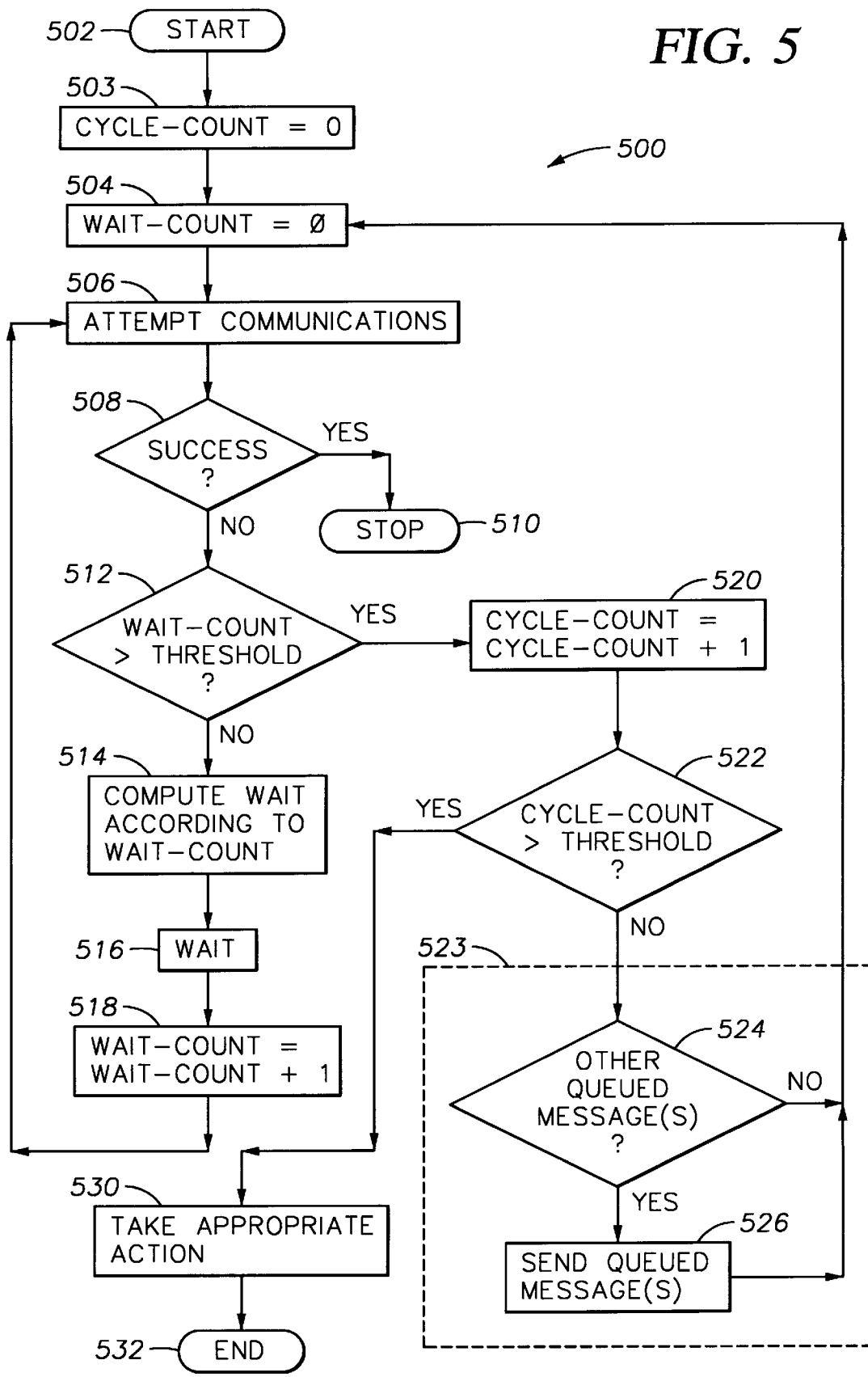
FIG. 5 is a flowchart illustrating one exemplary method for resolving conflicts in a communications network according to the invention.

FIG. 5 shows a sequence of method steps 500 to illustrate one example of the method aspect of the present invention. For ease of explanation, but without any limitation intended thereby, the example of FIG. 5 is described in the context of the multi-node network 100 using nodes 200, as described above. Thus, the sequence 500 is performed by the logic unit 202 executing machine-readable programming instructions, as discussed above. As an alternative (not shown), the sequence 500 may also be performed by a node, such as the node 300; in this alternative embodiment, the processing unit 302 implements the sequence 500 by executing machine-readable programming instructions. The sequence 500 may also be implemented in many other types of networks, other than the specific configuration illustrated by the network 100.

Preferably, each node in the network 100 independently performs the sequence 500 when that node attempts to send a message to another node. Alternatively, the sequence 500 may be performed by a limited number of nodes, if desired. For example, certain nodes may contain hardware or software that has been updated with respect to the remaining nodes.

In the illustrated example, the sequence 500 is performed by the node 200 to send a message to another node referred to as the "target node". The node 200 is therefore called the "requesting node".

Setting Counting Variables

After the sequence 500 is initiated in task 502, tasks 503–504 set counter variables "wait-count" and "cycle-count" equal to zero. As discussed in greater detail below, the waitcount variable is used to keep track of successive unsuccessful attempts of the requesting node 200 to communicate with the target node (not shown). Between communication attempts, the node 200 waits for successively longer and longer periods, ultimately reaching a maximum wait time. After reaching the maximum wait time, the wait period is reset. As discussed in further detail below, the cycle-count variable is used to record how many times the requesting node 200 sequentially advances through the entire sequence of wait times.

Attempting Communications

After task 504, task 506 attempts to send the desired communications to the target node. In the illustrated example, this involves the logic unit 202 directing the communicating interface 206 to transmit the message over a communication link using one of the lines 205–206. Query 508 then asks whether the message of task 506 was sent successfully. If so, the routine 500 ends in task 510.

Waiting Before Resending Communications

Instead of task 510, the routine progresses to query 512 if the message cannot reach the target node, e.g., due to the target node or the links being busy. Query 512 asks whether wait-count exceeds a wait-count threshold value. The wait-count threshold value may be permanently fixed, or it may be programmably set prior to operation of the routine 500. In an illustrative embodiment, the wait-count threshold is set to achieve the most efficient operation of the sequence 500 based on empirical data.

If wait-count does not exceed its threshold, the logic unit 202 in task 514 computes a waiting period according to the current wait-count. The computation of the waiting period, discussed in greater detail below, is preferably done to implement an exponential backoff incorporating a controlled aspect of randomness.

After computing the waiting period in task 514, the logic unit 202 waits for the computed waiting period in task 516, prior to resending the communications message. Since wait-count is initially zero, the wait period used in the first performance of task 516 is a minimum value. In an illustrative embodiment, this minimum waiting time is set empirically to achieve the most efficient operation of the sequence 500. The minimum waiting time may be permanently fixed, or it may be programmably set prior to operation of the routine 500.

Alternatively, if the sequence 500 is executed by a node such as the node 300, the node 300 may perform various background activity, such as performing other computations, managing data, or engaging in another suitable activity. The background activity may even involve sending other awaiting messages to new target nodes, different than the original target node. These background activities are facilitated by the availability of a multi-purpose processing unit 302 as opposed to the more specialized logic unit 202.

After the logic unit 202 waits in task 516, task 518 increments the wait-count by one to accurately reflect the number of times task 516 has been performed. Then, following task 518, the node 200 re-attempts the communications in task 506.

Waiting Too Long: Next Action

After query 512 finds that wait-count exceeds its threshold, inquiry is made to determine which action should be taken next, in order to most efficiently utilize the requesting node's resources during the unavailability of the target node.

First, task 520 increments cycle-count by one. Cycle-count keeps track of the number of times that wait-count has completed its entire cycle of increasing values, ultimately exceeding the wait-count threshold. In other words, cycle-count counts the times that the cycle ending with query 512 answering "yes" has occurred. After task 520, query 522 determines whether cycle-count exceeds another threshold, particular to cycle-count. If the cycle-count threshold is not yet surpassed, this is deemed a good time for the node 200 to perform some background activity in task 523. The cycle-count threshold value may be permanently fixed, or it may be programmably set prior to operation of the routine 500. In an illustrative embodiment, the cycle-count threshold is set empirically to achieve the most efficient operation of the sequence 500.

The background activity of task 523 may comprise performing computations, data management, or another suitable activity. Preferably, as illustrated, the background activity involves sending other awaiting messages to new target nodes, different than the original target node. Although the busy-ness of the target node frustrates communication attempts, communications with the new target nodes may be conducted in the meantime.

If the background activity involves sending any other awaiting messages, as illustrated, step 523 is implemented by query 524 and task 526. Namely, query 524 determines whether the node 200 is maintaining other messages for sending to new target nodes, different than the original target node. If so, the node 200 in task 526 sends these messages. Preferably, the sending of these messages in task 526 involves repeating the sequence 500 for each message or new target node. After task 526, or a negative answer to query 524, the routine 500 branches back to task 504.

Although Branching back to task 504 resets wait-count, cycle-count is not affected. Therefore, cycle-count continues to increase, ultimately exceeding its threshold, and branching from query 522 to task 530. In this event, node 200 has waited long enough without success. In this case, task 530 takes appropriate action. This action may involve initiating an error recovery routine to determine whether some error has occurred, preventing the transmission of communications to the target node. Alternatively, task 530 may involve sending the message via an alternate path, employing other hardware components for example. As an example, the error recovery routine, as well as the alternate message transmission, may be initiated by the node 200 generating a hardware interrupt. As another alternative the node 200 may simply abandon the failed communications request in task 530, and generate an appropriate error message.

After task 530, the routine 500 ends in task 532.

Computing Wait Periods

The computation of the wait period (task 514) may be performed in a number of different ways. In one embodiment, the wait period increases by one fixed increment each time wait-count increases. In this embodiment, the waiting period increases linearly. In another embodiment, the wait period is determined each time by a random code generator. In another embodiment, the waiting period is determined by exponential backoff. With exponential backoff, the initial waiting period is multiplied by some factor each time waitcount increases. Therefore, it grows exponentially.

In the preferred embodiment, the waiting period is determined using exponential backoff that incorporates a controlled aspect of randomness. Referring to FIG. 6, the waiting period of task 516 is determined by the contents of a wait register 600, which includes a plurality of binary bits. The value contained in the wait register, for example, may represent a number of cycles that a system clock of the processing unit 302 spends waiting for the next communications attempt. The contents of the wait register 600 are determined by copying a base code 602 from a base register into the wait register 600. The base code 602, in the illustrated example, remains constant. The base code 602 itself does not determine the waiting period, though, because a scrambling code 604 is also copied into the wait register 600.

The scrambling code 604 may be determined in a number of different ways. In one example, the scrambling code 604 is provided by a random number generating routine. Preferably, however, the scrambling code 604 is extracted from the node-ID uniquely assigned to the requesting node 200. Preferably, a different portion of the node-ID is extracted each time task 514 is performed. As a result, two competing requesting nodes will ultimate compute different wait periods, even if there is some commonality in their node-IDs.

To determine the first waiting period (i.e., when wait-count equals zero), the base code 602 and then the scrambling code 604 are copied into the least significant bits of the wait register 600. The scrambling code 604 overwrites several bits of the base code 602. This leaves a portion of the base code 602 in a location 606, abutting bits from the scrambling code 604 copied into a location 608. In the present example, the scrambling code 604 comprises four bits extracted from the node-ID of the node 300. Writing of these four bits into the location 608 overwrites the least significant four bits of the base code 602.

Next time task 514 is performed, the wait period is computed differently, as shown in FIG. 7. Namely, the base code 602 is copied into a location 700 of the wait register 600 that is shifted with respect to the locations 606–608. In the illustrated embodiment, this location is shifted one bit to the left, i.e., toward the most significant bits of the register 600. Then a scrambling code 702 is extracted from a different portion of the node-ID of the node 300, and copied into the location 608. Due to the shifting of the shifted location of the base code 602, however, it does not overwrite all of the base code 602 located at 608. Only the overlapping three bits arc overwritten. The steps of FIG. 7 result in a wait period that is exponentially increased with respect to the wait period of FIG. 6. Namely, the shifting of the base code 602 one bit to the left increases the wait period by about two. The factor of multiplication is not exactly two, however, due to the present introduction of the scrambling code 702 into the location 608, and the previous introduction of the scrambling code 604 into the location 608.

Subsequent performances of task 514 compute the wait period by continuing the steps of FIG. 7. Namely, each time, the base code 602 is copied into a location of the wait register 600 that is shifted with respect to the location 700. FIG. 8 depicts the state of the wait register 600 after eight repetitions of task 514. Accordingly, the base code 602 has been shifted to the location 800, a sufficient movement that the scrambling code 802 no longer overwrites any of the base code 602.

The steps of FIG. 8 result in a wait period that is multiplicatively increased with respect to the wait period of FIG. 7, and exponentially increased with respect to the wait period of FIG. 6. Namely, the shifting of the base code 602 one bit to the left increases the wait period by another factor of two. This multiplication factor is not exactly two, however, due to the introduction of the scrambling code 802 into the location 608.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. In a multi-node communications network including multiple interconnected nodes, a method for resolving conflicts between different nodes in the network, said method comprising:
   a first node in the network requesting to initiate communications with a target node;
   determining whether the communications were initiated with the target node; and
   if the communications were not initiated with the target node, the first node performing steps comprising:
      repeatedly performing a first process, comprising:
         determining a selected delay;
         waiting for the selected delay; and
         requesting to initiate communications with the target node;
         wherein the determining of the selected delay comprises starting with a predetermined value and increasing the selected delay in a predetermined manner after each unsuccessful request to initiate communications with the target node;
      after a predetermined number of repetitions of the first process without successfully initiating the requested communications, the first node performing one or more tasks unrelated to the request to initiate communications with the target node;
      returning to repeatedly performing the first process followed by performing the unrelated tasks until the unrelated tasks are performed a predetermined number of times; and
      initiating a predetermined unsuccessful communications recovery process after the unrelated tasks are performed the predetermined number of times.

2. The method of claim 1, the requested communications comprising a request to send a first message to the target node.

3. The method of claim 1, the one or more tasks unrelated to the request to initiate communications comprising sending one or more messages to one or more different nodes than the target node.

4. The method of claim 1, the tasks unrelated to the request to initiate communications comprising performing data processing unrelated to the request to initiate communications with the target node.

5. The method of claim 1, the unsuccessful communications recovery process comprising initiating steps to determine reasons for the requested communications not being successfully initiated.

6. The method of claim 1, the requested communications utilizing a first set of hardware components, the unsuccessful communications recovery process comprising utilizing a second set of hardware components different than the first set to request initiation of communications with the target node.

7. The method of claim 1, the unsuccessful communications recovery process comprising issuing of an error message.

8. The method of claim 1, the unsuccessful communications recovery process comprising aborting the request to initiate communications with the target node.

9. The method of claim 1, further comprising determining that the target node is available and in response the first node successfully initiating the requested communications with the target node.

10. The method of claim 1, the determining of the selected delay increasing the selected delay by successively larger increments after each unsuccessful request to initiate communications with the target node.

11. The method of claim 1, wherein the first process comprises:
   loading a base value into a wait register;
   the first node waiting for the selected delay proportional to contents of the wait register and then requesting to initiate communications with the target node; and
   after each unsuccessful request to initiate communications, performing steps comprising:
      determining new contents of the wait register by multiplying the base value by a predetermined factor to yield a base product and loading the base product into the wait register, said factor increasing with each unsuccessful request to initiate communications; and
      returning to the step of waiting for the selected delay.

12. The method of claim 11, the determining of the new contents of the wait register further obtaining a scrambling code and placing the code into the wait register overwriting any portion of the base value or base product therein.

13. The method of claim 12 wherein, obtaining the scrambling code comprises generating a random number.

14. The method of claim 12, each node in the network having a unique node identification code, the obtaining of the scrambling code comprising obtaining a portion of the node identification code of the first node.

15. The method of claim 1, wherein the first process repeatedly performs a process comprising:
   loading a binary base value into a wait register, the wait register having a plurality of bit positions ranked from least significant to most significant;
   obtaining a binary scrambling code and placing the scrambling code into the least significant bit positions of the wait register overwriting any bits of the base value therein;
   determining the selected delay in proportion to contents of the wait register; and
   the first node waiting for the selected delay and then requesting to initiate communications with the target node;
   wherein, after each unsuccessful attempt to initiate communications with the target node, the base value is loaded into a new position in the wait register closer to the most significant bits by a predetermined increment.

16. The method of claim 15, the predetermined increment comprising one bit.

17. The method of claim 15, the obtaining of the scrambling code comprising randomly generating a number.

18. The method of claim 11, the scrambling code comprising a portion of an identification code exclusively associated with the first node.

19. An article of manufacture comprising signal-bearing media tangibly embodying a program of machine-readable instructions executable by a digital processing apparatus of a first node in a multi-node communications network to resolve conflicts with other nodes in the network, said resolving of conflicts comprising:

the first node in the network requesting to initiate communications with a target node;

determining whether the communications were initiated with the target node; and if the communications were not initiated with the target node, the first node performing steps comprising:

repeatedly performing a first process, comprising:

determining a selected delay;

waiting for the selected delay; and requesting to initiate communications with the target node;

wherein the determining of the selected delay comprises starting with a predetermined value and increasing the selected delay in a predetermined manner after each unsuccessful request to initiate communications with the target node;

after a predetermined number of repetitions of the first process without successfully initiating the requested communications, the first node performing one or more tasks unrelated to the request to initiate communications with the target node;

returning to repeatedly performing the first process followed by performing the unrelated tasks until the unrelated tasks are performed a predetermined number of times; and initiating a predetermined unsuccessful communications recovery process after the unrelated tasks are performed the predetermined number of times.

20. The article of manufacture of claim 19, the requested communications comprising a request to send a first message to the target node.

21. The article of manufacture of claim 19, the one or more tasks unrelated to the request to initiate communications comprising sending one or more messages to one or more different nodes than the target node.

22. The article of manufacture of claim 19, the task unrelated to the request to initiate communications comprising performing data processing unrelated to the request to initiate communications with the target node.

23. The article of manufacture of claim 19, the unsuccessful communications recovery process comprising initiating steps to determine reasons for the requested communications not being successfully initiated.

24. The article of manufacture of claim 19, the requested communications utilizing a first set of hardware components, the unsuccessful communications recovery process comprising utilizing a second set of hardware components different than the first set to request initiation of communications with the target node.

25. The article of manufacture of claim 19, the unsuccessful communications recovery process comprising issuing of an error message.

26. The article of manufacture of claim 19, the unsuccessful communications recovery process comprising aborting the request to initiate communications with the target node.

27. The article of manufacture of claim 19, the resolving of conflicts further comprising determining that the target node is available and in response the first node successfully initiating the requested communications with the target node.

28. The article of manufacture of claim 19, the determining of the selected delay increasing the selected delay by successively larger increments after each unsuccessful request to initiate communications with the target node.

29. The article of manufacture of claim 19, wherein the first process comprises:

loading a base value into a wait register;

the first node waiting for the selected delay proportional to contents of the wait register and then requesting to initiate communications with the target node; and after each unsuccessful request to initiate communications, performing steps comprising:

determining new contents of the wait register by multiplying the base value by a predetermined factor to yield a base product and loading the base product into the wait register, said factor increasing with each unsuccessful request to initiate communications; and returning to the step of waiting for the selected delay.

30. The article of manufacture of claim 29, the determining of the new contents of the wait register further obtaining a scrambling code and placing the code into the wait register overwriting any portion of the base value or base product therein.

31. The article of manufacture of claim 30, the obtaining of a scrambling code comprising generating a random number.

32. The article of manufacture of claim 30, each node in the network having a unique node identification code, the obtaining of the scrambling code comprising obtaining a portion of the node identification code of the first node.

33. The article of manufacture of claim 19, wherein the first process repeatedly performs a process comprising:

loading a binary base value into a wait register, the wait register having a plurality of bit positions ranked from least significant to most significant;

obtaining a binary scrambling code and placing the scrambling code into the least significant bit positions of the wait register overwriting any bits of the base value therein;

determining the selected delay in proportion to contents of the wait register; and the first node waiting for the selected delay and then requesting to initiate communications with the target node;

wherein, after each unsuccessful attempt to initiate communications with the target node, the base value is loaded into a new position in the wait register closer to the most significant bits by a predetermined increment.

34. The article of manufacture of claim 33, the predetermined increment comprising one bit.

35. The article of manufacture of claim 33 wherein, obtaining the scrambling code comprises randomly generating a number.

36. The article of manufacture of claim 33, the scrambling code comprising a portion of an identification code exclusively associated with the first node.

37. A node in a multi-node communications network, said node comprising:

a communications interface;

a communications director being programmed to resolve conflicts with other nodes in the network by:

requesting to initiate communications with a target node;

determining whether the communications were initiated with the target node; and if the communications were not initiated with the target node, performing steps comprising:

repeatedly performing a first process, comprising:

determining a selected delay;

waiting for the selected delay; and requesting to initiate communications with the target node;

wherein the determining of the selected delay comprises starting with a predetermined value and increasing the selected delay in a predetermined manner after each unsuccessful request to initiate communications with the target node;

after a predetermined number of repetitions of the first process without successfully initiating the requested communications, performing one or more tasks unrelated to the request to initiate communications with the target node;

returning to repeatedly performing the first process followed by performing the unrelated tasks until the unrelated tasks are performed a predetermined number of times; and initiating a predetermined unsuccessful communications recovery process after the unrelated tasks are performed the predetermined number of times.

38. The node of claim 37, the communications director including hardware logic circuitry, the programming of the communications director comprising configuration of hardware logic circuitry.

39. The node of claim 37, the communications director including a digital processing apparatus, the programming of the communications director comprising execution of a sequence of machine-readable instructions by the digital processing apparatus.

40. The node of claim 37, the requested communications comprising a request to send a first message to the target node.

41. The node of claim 37, the one or more tasks unrelated to the request to initiate communications comprising sending one or more messages to one or more different nodes than the target node.

42. The node of claim 37, the tasks unrelated to the request to initiate communications comprising performing data processing unrelated to the request to initiate communications with the target node.

43. The node of claim 37, the unsuccessful communications recovery process comprising initiating steps to determine reasons for the requested communications not being successfully initiated.

44. The node of claim 37, the requested communications utilizing a first set of hardware components, the unsuccessful communications recovery process comprising utilizing a second set of hardware components different than the first set to request initiation of communications with the target node.

45. The node of claim 37, the unsuccessful communications recovery process comprising issuing of an error message.

46. The node of claim 37, the unsuccessful communications recovery process comprising aborting the request to initiate communications with the target node.

47. The node of claim 37, the communications director being further programmed to determine that the target node is available, and in response, successfully initiating the requested communications with the target node.

48. The node of claim 37, the determining of the selected delay increasing the selected delay by successively larger increments after each unsuccessful request to initiate communications with the target node.

49. The node of claim 37, wherein the first process comprises:

loading a base value into a wait register;

waiting for a selected delay proportional to contents of the wait register and then requesting to initiate communications with the target node; and after each unsuccessful request to initiate communications, performing steps comprising:

determining new contents of the wait register by multiplying the base value by a predetermined factor to yield a base product and loading the base product into the wait register, said factor increasing with each unsuccessful request to initiate communications; and returning to the step of waiting for the selected delay.

50. The node of claim 49, the determining of the new contents of the wait register further obtaining a scrambling code and placing the code into the wait register overwriting any portion of the base value or base product therein.

51. The node of claim 50, the obtaining of the scrambling code comprising generating a random number.

52. The node of claim 50, each node in the network having a unique node identification code, the obtaining of the scrambling code comprising obtaining a portion of the node identification code of the first node.

53. The node of claim 37, wherein the first process repeatedly performs a process comprising:

loading a binary base value into a wait register, the wait register having a plurality of bit positions ranked from least significant to most significant;

obtaining a binary scrambling code and placing the scrambling code into the least significant bit positions of the wait register overwriting any bits of the base value therein;

determining the selected delay in proportion to contents of the wait register; and the first node waiting for the selected delay and then requesting to initiate communications with the target node;

wherein, after each unsuccessful attempt to initiate communications with the target node, the base value is loaded into a new position in the wait register closer to the most significant bits by a predetermined increment.

54. The node of claim 53, the predetermined increment comprising one bit.

55. The node of claim 53, the obtaining of the scrambling code comprising randomly generating a number.

56. The node of claim 50, the scrambling code comprising a portion of an identification code exclusively associated with the first node.

57. A node in a multi-node communications network, said node comprising:

communications interface means;

communications director means, coupled to the interface means, for resolving conflicts with other nodes in the network by:

requesting to initiate communications with a target node;

determining whether the communications were initiated with the target node; and if the communications were not initiated with the target node:

repeatedly performing a first process, comprising:

determining a selected delay, said selected delay;

waiting for the selected delay; and requesting to initiate communications with the target node;

wherein the determining of the selected delay comprises starting with a predetermined value and increasing in a predetermined manner after each unsuccessful request to initiate communications with the target node;

after a predetermined number of repetitions of the first process without successfully initiating the requested communications, performing one or more tasks unrelated to the request to initiate communications with the target node;

returning to repeatedly performing the first process followed by performing the unrelated tasks until the unrelated tasks are performed a predetermined number of times; and initiating a predetermined unsuccessful communications recovery process after the unrelated tasks are performed the predetermined number of times.

58. A multi-node communications network, comprising:

multiple communications nodes;

communications links interconnecting the nodes in a predetermined fashion;

each node being programmed to resolve conflicts with other nodes in the network by:

requesting to initiate communications with a target node;

determining whether the communications were initiated with the target node; and if the communications were not initiated with the target node, performing steps comprising:

repeatedly performing a first process, comprising:

determining a selected delay;

waiting for the selected delay; and requesting to initiate communications with the target node;

wherein the determining of the selected delay comprises starting with a predetermined value and increasing in a predetermined manner after each unsuccessful request to initiate communications with the target node;

after a predetermined number of repetitions of the first process without successfully initiating the requested communications, performing one or more tasks unrelated to the request to initiate communications with the target node;

returning to repeatedly performing the first process followed by performing the unrelated tasks until the unrelated tasks are performed a predetermined number of times; and initiating a predetermined unsuccessful communications recovery process after the unrelated tasks are performed the predetermined number of times.

59. The network of claim 58, the nodes each including hardware logic circuitry, the programming of the nodes comprising configuration of hardware logic circuitry.

60. The network of claim 58, the nodes each including a digital processing apparatus, the programming of the nodes comprising execution of a sequence of machine-readable instructions by the digital processing apparatus.

61. The network of claim 58, the nodes comprising at least one computer.

62. The network of claim 58, the links comprising conductive cables.

63. The network of claim 58, the links comprising electromagnetic transmitters and receivers.

64. The network of claim 58, the links interconnecting each node to every other node.

65. The network of claim 58, the requested communications comprising a request to send a first message to the target node.

66. The network of claim 58, the one or more tasks unrelated to the request to initiate communications comprising sending one or more messages to one or more different nodes than the target node.

67. The network of claim 58, the tasks unrelated to the request to initiate communications comprising performing data processing unrelated to the request to initiate communications with the target node.

68. The network of claim 58, the unsuccessful communications recovery process comprising initiating steps to determine reasons for the requested communications not being successfully initiated.

69. The network of claim 58, the requested communications utilizing a first set of hardware components, the unsuccessful communications recovery process comprising utilizing a second set of hardware components different than the first set to request initiation of communications with the target node.

70. The network of claim 58, the unsuccessful communications recovery process comprising issuing of an error message.

71. The network of claim 58, the unsuccessful communications recovery process comprising aborting the request to initiate communications with the target node.

72. The network of claim 58, each node being further programmed to determine that the target node is available and in response successfully initiate the requested communications with the target node.

73. The network of claim 58, the determining of the selected delay increasing the selected delay by successively larger increments after each unsuccessful request to initiate communications with the target node.

74. The network of claim 58, wherein the first process comprises:

loading a base value into a wait register;

waiting for a selected delay proportional to contents of the wait register and then requesting to initiate communications with the target node; and after each unsuccessful request to initiate communications, performing steps comprising:

determining new contents of the wait register by multiplying the base value by a predetermined factor to yield a base product and loading the base product into the wait register, said factor increasing with each unsuccessful request to initiate communications; and returning to the step of waiting for the selected delay.

75. The network of claim 74, the determining of the new contents of the wait register further obtaining a scrambling code and placing the code into the wait register overwriting any portion of the base value or base product therein.

76. The network of claim 75, the obtaining of a scrambling code comprising generating a random number.

77. The network of claim 75, each node in the network being associated with a unique node identification code, the obtaining of the scrambling code comprising obtaining a portion of the node identification code associated with the node determining the new contents of the wait register.

78. The network of claim 58, wherein the first process repeatedly performs a process comprising:

loading a binary base value into a wait register, the wait register having a plurality of bit positions ranked from least significant to most significant;

obtaining a binary scrambling code and placing the scrambling code into the least significant bit positions of the wait register overwriting any bits of the base value therein;

determining the selected delay in proportion to contents of the wait register; and waiting for the selected delay and then requesting to initiate communications with the target node;

wherein, after each unsuccessful attempt to initiate communications with the target node, the base value is loaded into a new position in the wait register closer to the most significant bits by a predetermined increment.

79. The network of claim 78, the predetermined increment comprising one bit.

80. The network of claim 78, the obtaining of the scrambling code comprising randomly generating a number.

81. The network of claim 75, the scrambling code comprising a portion of an identification code exclusively associated with the node determining the new contents of the wait register.

* * * * *